(12) United States Patent
Bill

(10) Patent No.: US 8,473,441 B2
(45) Date of Patent: *Jun. 25, 2013

(54) TRANSLATING PARALINGUISTIC INDICATORS

(75) Inventor: David S. Bill, San Francisco, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/189,827

(22) Filed: Jul. 25, 2011

(65) Prior Publication Data

US 2011/0282646 A1  Nov. 17, 2011

Related U.S. Application Data

(63) Continuation of application No. 11/767,819, filed on Jun. 25, 2007, now Pat. No. 8,010,474.

(60) Provisional application No. 60/824,537, filed on Sep. 5, 2006.

(51) Int. Cl.
*G06F 17/00* (2006.01)

(52) U.S. Cl.
USPC ............... 706/46; 709/204; 715/757; 463/40

(58) Field of Classification Search
USPC ............................................. 706/46; 715/706
See application file for complete search history.

(56) References Cited

U.S. PATENT DOCUMENTS

| | | | | |
|---|---|---|---|---|
| 5,878,219 | A * | 3/1999 | Vance et al. | 709/217 |
| 5,880,731 | A | 3/1999 | Liles et al. | |
| 6,801,663 | B2 | 10/2004 | Matsushita et al. | |
| 6,816,578 | B1 * | 11/2004 | Kredo et al. | 379/88.17 |
| 6,876,728 | B2 * | 4/2005 | Kredo et al. | 379/88.17 |
| 6,963,839 | B1 * | 11/2005 | Ostermann et al. | 704/260 |
| 7,379,066 | B1 | 5/2008 | Ostermann et al. | |
| 7,386,799 | B1 | 6/2008 | Clanton et al. | |
| 7,574,332 | B2 | 8/2009 | Ballin et al. | |
| 7,913,176 | B1 * | 3/2011 | Blattner et al. | 715/758 |
| 2002/0049507 | A1 * | 4/2002 | Hameen-Anttila | 700/92 |
| 2002/0160838 | A1 * | 10/2002 | Kim | 463/42 |
| 2004/0179039 | A1 * | 9/2004 | Blattner et al. | 345/758 |
| 2005/0137015 | A1 | 6/2005 | Rogers et al. | |

(Continued)

OTHER PUBLICATIONS

USPTO, Office Action dated Aug. 16, 2010, U.S. Appl. No. 11/850,235 (9 pages).
USPTO, Final Office Action dated Feb. 3, 2011, U.S. Appl. No. 11/850,235 (12 pages).
Rana El Kaliouby and Peter Robinson, 2004, FAIM: Integrating Automated Facial Affect Analysis in Instant Messaging, In Proceedings of the 9th International Conference on Intelligent User Interfaces (IUI '04), ACM, New York, NY, USA, 244-246.
Persson et al., Expressive Messaging on Mobile Platforms, Swedish Institute of Computer Science, SICS Technical Report T2001:09, Apr. 25, 2001.

*Primary Examiner* — Jeffrey A Gaffin
*Assistant Examiner* — David H Kim
(74) *Attorney, Agent, or Firm* — Wolfe-SBMC

(57) ABSTRACT

Paralinguistic indicators are translated at a paralinguistic translation server by receiving from a source a first set of data related to a first paralinguistic indicator that is configured to enable non-verbal communications between a source and a destination. The source is one of an instant messaging system and a virtual world system and the destination is one of the textual instant messaging system and a virtual world system but differs from the source. The first set of data related to the first paralinguistic indicator is translated into a second set of data related to a second paralinguistic indicator, such that the second paralinguistic indicator that is at least partially synonymous to the non-verbal communications associated with the first paralinguistic indicator. The second set of data related to the second paralinguistic indicator is transmitted to the destination.

18 Claims, 9 Drawing Sheets

U.S. PATENT DOCUMENTS

| | | |
|---|---|---|
| 2006/0075055 A1* | 4/2006 | Littlefield .................... 709/206 |
| 2006/0077205 A1 | 4/2006 | Guymon et al. |
| 2006/0123127 A1 | 6/2006 | Littlefield |
| 2006/0170945 A1 | 8/2006 | Bill |
| 2007/0002057 A1 | 1/2007 | Danzig et al. |
| 2007/0021973 A1 | 1/2007 | Stremler |
| 2007/0050716 A1 | 3/2007 | Leahy et al. |
| 2007/0082738 A1 | 4/2007 | Fickie et al. |
| 2007/0218987 A1 | 9/2007 | Van Luchene et al. |
| 2007/0233839 A1 | 10/2007 | Gaos |
| 2007/0239826 A1 | 10/2007 | Ducheneaut et al. |
| 2007/0240119 A1 | 10/2007 | Ducheneaut et al. |
| 2007/0255807 A1 | 11/2007 | Hayashi et al. |
| 2007/0266090 A1 | 11/2007 | Len |
| 2008/0059570 A1 | 3/2008 | Bill |
| 2008/0215972 A1 | 9/2008 | Zalewski et al. |

\* cited by examiner

500

| Image | Text String | Text.. | Meaning |
|---|---|---|---|
| | :) :-> | (Nice) | happy |
| | :( | (sad) | sad |
| | ;) | | winking |
| | :D | | big grin |
| | ;;) | | batting eyelashes |
| | >:D< | | big hug |
| | :-/ | | confused |
| | :x | | love struck |
| | :"> | | blushing |
| | :P | | tongue |
| | :-* | | kiss |
| | =(( | | broken heart |
| | :-O | | surprise |
| | X( | (mad) | angry |
| | :> | | smug |
| | B-) | | cool |
| | :-S | | worried |
| | #:-S | | whew! |
| | >:) | (devil) | devil |
| | :(( | | crying |
| | :)) | lol | laughing |
| | :| | | straight face |
| | /:) | | raised eyebrow |
| | =)) | rolf | rolling on the floor |
| | O:) | (angel) | angel |
| | :-B | | nerd |
| | =; | | talk to the hand |

| Sample XML Schema |
|---|
| `<xsd:schema xmlns:xsd="http://www.w3.org/2001/XMLSchema">` |
| Negative and forceful — 905a |
| `<xsd:enumeration value="anger"/>`<br>`<xsd:enumeration value="annoyance"/>`<br>`<xsd:enumeration value="contempt"/>`<br>`<xsd:enumeration value="disgust"/>`<br>`<xsd:enumeration value="irritation"/>` |
| Negative thoughts — 905b |
| `<xsd:enumeration value="doubt"/>`<br>`<xsd:enumeration value="envy"/>`<br>`<xsd:enumeration value="frustration"/>`<br>`<xsd:enumeration value="guilt"/>dai`<br>`<xsd:enumeration value="shame"/>` |
| Negative and passive — 905c |
| `<xsd:enumeration value="boredom"/>`<br>`<xsd:enumeration value="despair"/>`<br>`<xsd:enumeration value="disappointment"/>`<br>`<xsd:enumeration value="hurt"/>`<br>`<xsd:enumeration value="sadness"/>` |
| Agitation — 905d |
| `<xsd:enumeration value="shock"/>`<br>`<xsd:enumeration value="stress"/>`<br>`<xsd:enumeration value="tension"/>` |
| Positive and lively — 905e |
| `<xsd:enumeration value="amusement"/>`<br>`<xsd:enumeration value="delight"/>`<br>`<xsd:enumeration value="elation"/>`<br>`<xsd:enumeration value="excitement"/>`<br>`<xsd:enumeration value="happiness"/>`<br>`<xsd:enumeration value="joy"/>`<br>`<xsd:enumeration value="pleasure"/>` |
| Caring — 905f |
| `<xsd:enumeration value="affection"/>`<br>`<xsd:enumeration value="empathy"/>`<br>`<xsd:enumeration value="friendliness"/>`<br>`<xsd:enumeration value="love"/>` |
| Reactive — 905g |
| `<xsd:enumeration value="interest"/>`<br>`<xsd:enumeration value="politeness"/>`<br>`<xsd:enumeration value="surprise"/>`<br>`</xsd:schema>` |

TRANSLATING PARALINGUISTIC INDICATORS

CROSS-REFERENCE TO RELATED APPLICATIONS

The present application is a continuation of U.S. application Ser. No. 11/767,819, filed Jun. 25, 2007 now U.S. Pat. No. 8,010,474, and titled "TRANSLATING PARALINGUISTIC INDICATORS", which claims the benefit of priority from U.S. Provisional Application No. 60/824,537, filed Sep. 5, 2006, and titled "A SYSTEM FOR TRANSLATING PARALINGUISTIC INDICATORS." Each of the above referenced applications is incorporated by reference herein in their entirety.

TECHNICAL FIELD

The document relates generally to a system and method for translating paralinguistic indicators.

SUMMARY

In one general sense, a method for translating paralinguistic indicators at a paralinguistic translation server includes receiving a first set of data from a source, the first set of data being related to a first paralinguistic indicator that is configured to enable non-verbal communications between a source and a destination. The source is one of an instant messaging system and a virtual world system and the destination is one of the textual instant messaging system and a virtual world system but differs from the source. The method also includes translating the first set of data related to the first paralinguistic indicator into a second set of data related to a second paralinguistic indicator that is at least partially synonymous to the non-verbal communications associated with the first paralinguistic indicator. The method further includes transmitting the second set of data related to the second paralinguistic indicator to the destination.

Implementations may include one or more of the follow features. For example, receiving from the source the first set of data related to the first paralinguistic indicator may include receiving a set of data related to an emoticon. Also, receiving from the source the first set of data may include receiving a set of XML data. The virtual world system may also include a web camera system with face tracking software.

In another general sense, a system for translating between inconsistent paralinguistic indicators of two communication systems with different capabilities for conveying non-verbal communications includes a paralinguistic translation server module structured and arranged to receive a first set of data from a source related to a first paralinguistic indicator that is configured to enable non-verbal communications between a source and a destination. The source is one of a first communication system with lesser capability for conveying non-verbal communications and a second system with greater capability for conveying non-verbal communications, and the destination is one of the of the first communication system with lesser capability for conveying non-verbal communications and the second system with greater capability for conveying non-verbal communications but differs from the source. The paralinguistic translation server module is also structured and arranged to translate the first set of data related to the first paralinguistic indicator into a second set of data related to a second paralinguistic indicator that is at least to partially synonymous of the first paralinguistic indicator, and transmit the second set of data related to the second paralinguistic indicator to the destination.

Implementations may include one or more of the follow features. For example, the system with lesser capability for conveying non-verbal communications may include an instant messenger client. Also, the system with lesser capability for conveying non-verbal communications may include an email client. Further, the system with greater capability for conveying non-verbal communications may include a virtual reality system. Moreover, the system with greater capability for conveying non-verbal communications may include a web camera system with face tracking software.

Implementations of any of the techniques described may include a method or process, an apparatus or system, or computer software on a computer-accessible medium. The details of particular implementations are set forth below. Other features will be apparent from the description and drawings, and from the claims.

BACKGROUND

Users rely on a variety of applications to exchange information with other users.

DESCRIPTION OF FIGURES

FIG. 5 illustrates a table of exemplary emoticons and associated text triggers.

FIG. 9 illustrates an exemplary XML schema for expressing intermediate paralinguistic descriptions.

DETAILED DESCRIPTION

Users of the virtual world systems, such as "Second Life," may wish to communicate paralinguistic indicators (e.g., emotions, gestures, and moods) of their respective avatars to others who utilize text-based communications systems, such as instant messaging or email. However, paralinguistic indicators in virtual world systems may be richer (e.g., capable of displaying complex emotions or gestures) than paralinguistic indicators available in text-based communications systems. Consequently, paralinguistic indicators used in virtual world systems may not be compatible with paralinguistic indicators used in text-based communication systems.

For illustrative purposes, FIGS. 1-9 illustrate aspects (e.g., user interface, process flow, system diagram) related to a system for translating paralinguistic indicators at a paralinguistic translation server. A user of a virtual world (VW) system, who operates an avatar inside the virtual world, communicates with a user of an instant messaging (IM) system. For example, the VW user may wish to express a set of emotions or actions through the behavior of an avatar and have these emotions/actions communicated to the IM user.

Thus, if the VW user is feeling angry, the VW user may communicate an angry mood through some actions of her avatar.

Consequently, paralinguistic indicators of the VW user's avatar (e.g., gesticulations, actions, or facial expressions) are encoded as a set of data and transmitted from the VW system to the paralinguistic translation server. The paralinguistic translation server translates paralinguistic indicators of the VW system into the paralinguistic indicators of the IM system. For example, the paralinguistic translation server evaluates the avatar's paralinguistic indicators and translates these indicators into the at least partially synonymous or corresponding paralinguistic indicator(s) in the IM system. The paralinguistic indicators are then added to an instant message and transmitted to the IM user. The paralinguistic indicators in the IM system may be still indicators, such as an "angry face" emoticon, or more complex, animated indicators, such as expressions conveyed by an animated SuperBuddy®. The paralinguistic indicator(s) may be two-dimensional or three-dimensional.

Figure 1:
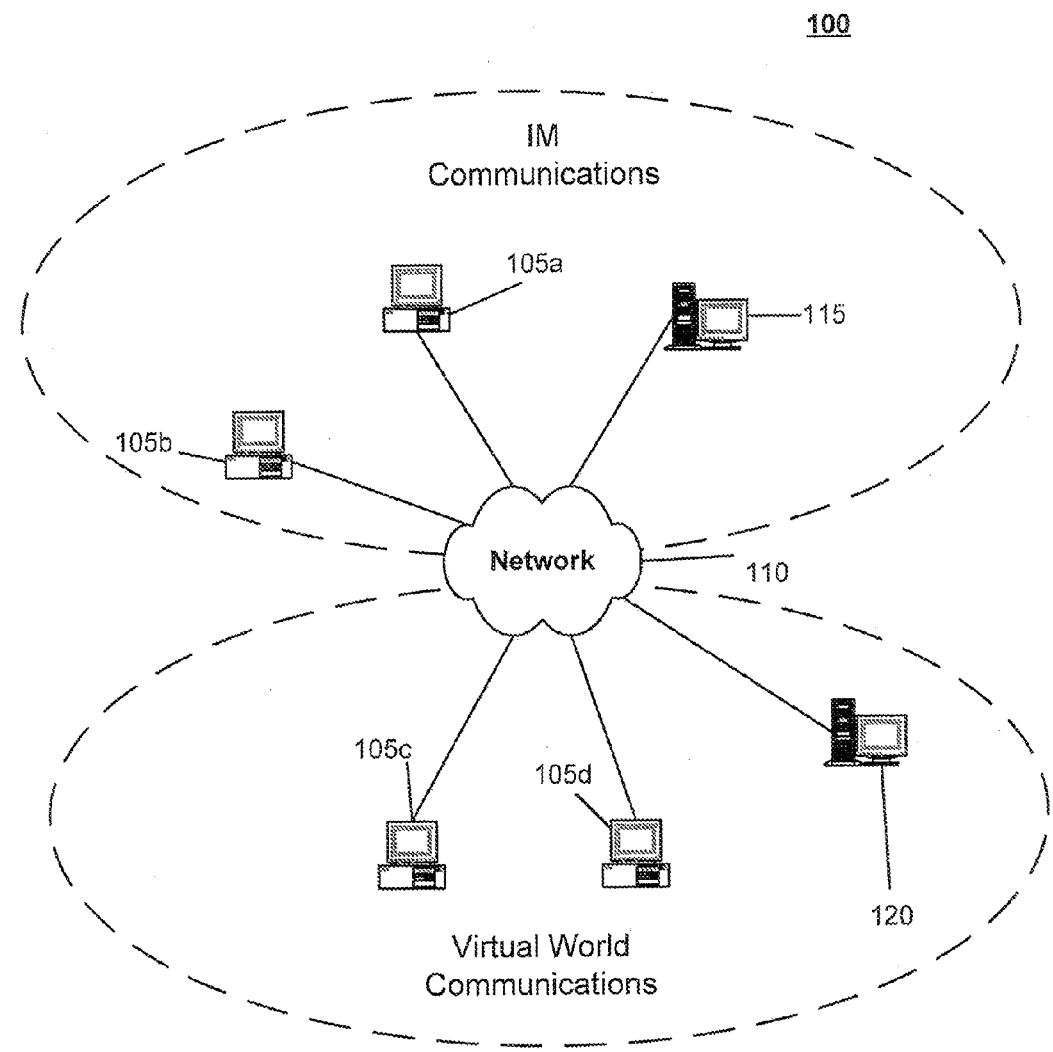
FIG. 1 illustrates an exemplary network computing environment enabling communications between users of instant messaging clients and virtual world clients.

FIG. 1 illustrates an exemplary networked computing environment 100 enabling communications between users of instant messaging (IM) clients and virtual worlds (VWs) clients. A network 110 interconnects client systems 105a-105d, which connect to network 110 to through various communication mediums, such as a modem connected to a telephone line (using, for example, serial line interne protocol (SLIP) or point-to-point protocol (PPP)) or a direct internetwork connection (using, for example, transmission control protocol/interne protocol (TCP/IP)). As such, users who are distributed geographically communicate using client systems 105a-105d. For example, users operating client systems 105a and 105b are utilizing instant IM clients to communicate with each other and virtual world users operating client systems 105c-105d. Similarly, users operating client systems 105c-105d are communicating within a virtual world and also with users outside of a virtual world. A virtual world presents an interactive three-dimensional (3D) graphical scene to users operating client systems 105c-105d, such that users operating client systems 105c-105d may interact via network 110 with the world and each other through textual, audio, and/or graphical communications.

Each of the client systems 105a-105d may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Client systems 105a-105d may receive instructions from, for example, a software application, a client, a piece of code, a device, a computer, a computer system, or a combination thereof, which independently or collectively direct operations, as described herein. These instructions may take the form of one or more communications clients that facilitate communications between the users of client systems 105a-105d. For instance, such communications clients may include electronic mail (e-mail) clients, IM clients, virtual world clients, or voice-over-IP clients. The instructions may be embodied permanently or temporarily in any type of machine, component, equipment, storage medium, or propagated signal that is capable of being delivered to the client systems 105a-105d.

Client systems 105a-105d include a communications interface (not shown) used by the communications clients to send communications through network 110. The communications may include e-mail, audio data, video data, general binary data, or text data (e.g., data encoded in American Standard Code for Information Interchange (ASCII) format).

The network 110 typically includes a communications infrastructure facilitating communications between the different client systems, and may include one or more hosts. Examples of the network 110 include the Internet, Wide Area Networks (WANs), Local Area to Networks (LANs), analog or digital wired and wireless telephone networks (e.g., a Public Switched Telephone Network (PSTN)), an Integrated Services Digital Network (ISDN), or a Digital Subscriber Line (xDSL)), or any other wired or wireless network. The network 110 may include multiple networks or subnetworks, each of which may include, for example, a wired or wireless data pathway.

Computing environment 100 also includes an instant messaging (IM) server 115 and a virtual world (VW) server 120 that are connected to network 110. The IM server 115 and the VW server 120 are used to facilitate direct or indirect communications between the client systems 105a-105d. As with the client systems 105a-105d, the IM server 115 and the VW server 120 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. The IM server 115 and the VW server 120 may receive instructions from, for example, a software application, a client, a piece of code, a device, a computer, a computer system, or a combination thereof, which independently or collectively direct operations, as described herein. These instructions may take the form of one or more communications clients. Such communications clients may include, for example, e-mail clients, VW clients, IM clients, and voice-over-IP clients. The instructions may be embodied permanently or temporarily in any type of machine, component, equipment, storage medium, or propagated signal that is capable of being delivered to the IM server 115 and the VW server 120.

Further, the IM server 115 and the VW server 120 include communications interfaces (not shown) used by the communications clients to exchange communications through network 110. The communications may include different forms of data, such as e-mail data, audio data, video data, general binary data, or text data.

Figure 2:
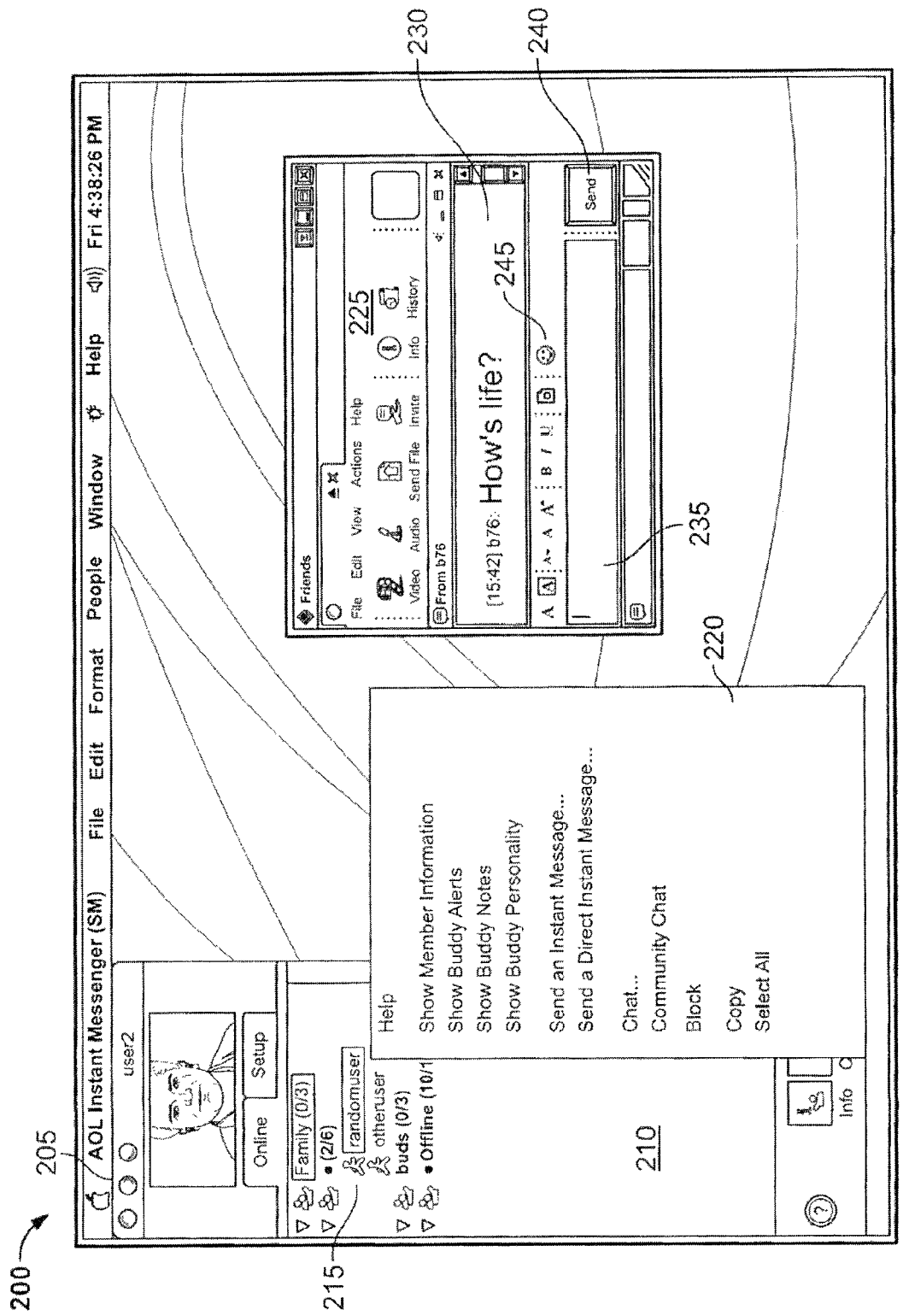
FIG. 2 illustrates an exemplary instant messaging interface presented to a user of an IM client.

FIG. 2 illustrates an exemplary instant messaging interface presented to a user of one of the client systems, such as the client system 105a. The IM client enables a user to communicate in real-time with other users using text and other input. For example, the IM client enables the user to send text communications in an instant message, transfer files, and communicate using voice. Examples of IM clients include those provided by AOL (America Online's AOL Instant Messenger (AIM)), Yahoo Messenger, MSN Messenger, and ICQ.

As shown, the IM system 200 presents a user with an IM user interface 205. User interface 205 includes a text box 210 that displays representations 215 of the user's contacts (e.g., an AIM Buddy appearing in an AIM BuddyList(TM)), which are other users participating in an IM system, by executing an IM client on another client system. For instance, in the exemplary interface shown, there are representations for two contacts, "randomuser" and "otheruser." The representations 215 provide status information for the user about the contact, such as whether the contact is online, how long the contact has been online, whether the contact is away, or whether the contact is using a mobile device.

The list of contacts displayed in text box 210 of user interface 205 may be referred to as a list of co-users, and the IM client user may add or remove contacts from the contact list.

In the example shown, the representations 215 are rendered as icons showing the screen names of the contacts.

The IM clients may use the IM server 115 to assist in communications between users of the IM clients. The IM server 115 may be configured to interact with a different IM services irrespective of which IM client is being used. The IM server 115 also may support associated services, such as administrative matters, advertising, directory services, chat, and interest groups related to instant messages.

To facilitate the transfer of data, the IM server 115 may implement one or more standard or proprietary IM protocols. The one or more protocols may enable the IM server 115 to facilitate the establishment of a peer-to-peer communication session between the IM client clients, or assist IM communications by directly routing communications between the IM client clients.

To engage in IM communications when using an IM server 115, an IM client on one of client systems 105a-105d establishes a connection with the IM server 115, authenticating itself in the process. Once the IM client has been authenticated, the IM client indicates whether a particular contact is presently online, exchanging IMs with particular contacts, participating in a group chat room, or trading files, such as pictures, invitations or documents. The IM client also may refresh other information such as an indication of (or ability to search for) other users with similar interests, and customized information such as news and stock quotes, and search the World Wide Web.

When a contact is online, the user may communicate or interact with the contact in a number of ways. For instance, the user can send an instant message to the contact (typically in the form of text). Sending a message opens up a window 225 in which messages can be typed and viewed as they are communicated back-and-forth between the user and the contact. Window 225 includes a text box 230 and an edit box 235. The sent and received messages of the user are displayed in text box 230. The sender's (i.e., user's or contact's) screen name may be listed beside the sender's corresponding message in text box 230. For instance, in the exemplary window shown, the user (whose screen name is "randomuser") has received a message "How's life?" from the contact (whose screen name is "b76"). To send a reply message, the user types the message in edit box 235 and activates a send command, for example, by pressing an ENTER key or selecting on a Send icon 240. In addition, an emoticon link 235 may be selected from window 225 to display a tool for specifying emoticons that are available when communicating with the contact. Generally, emoticons are two-dimensional images that are sent when certain triggers are included in the text of an instant message, as will be further discusses with respect to FIG. 5. For example, the character sequence ;) may be displayed as a "winking" smiley face. As a result of entering an emoticon, the entered text, along with the emoticons, is displayed in text box 230 within contact's user interface.

Figure 3:
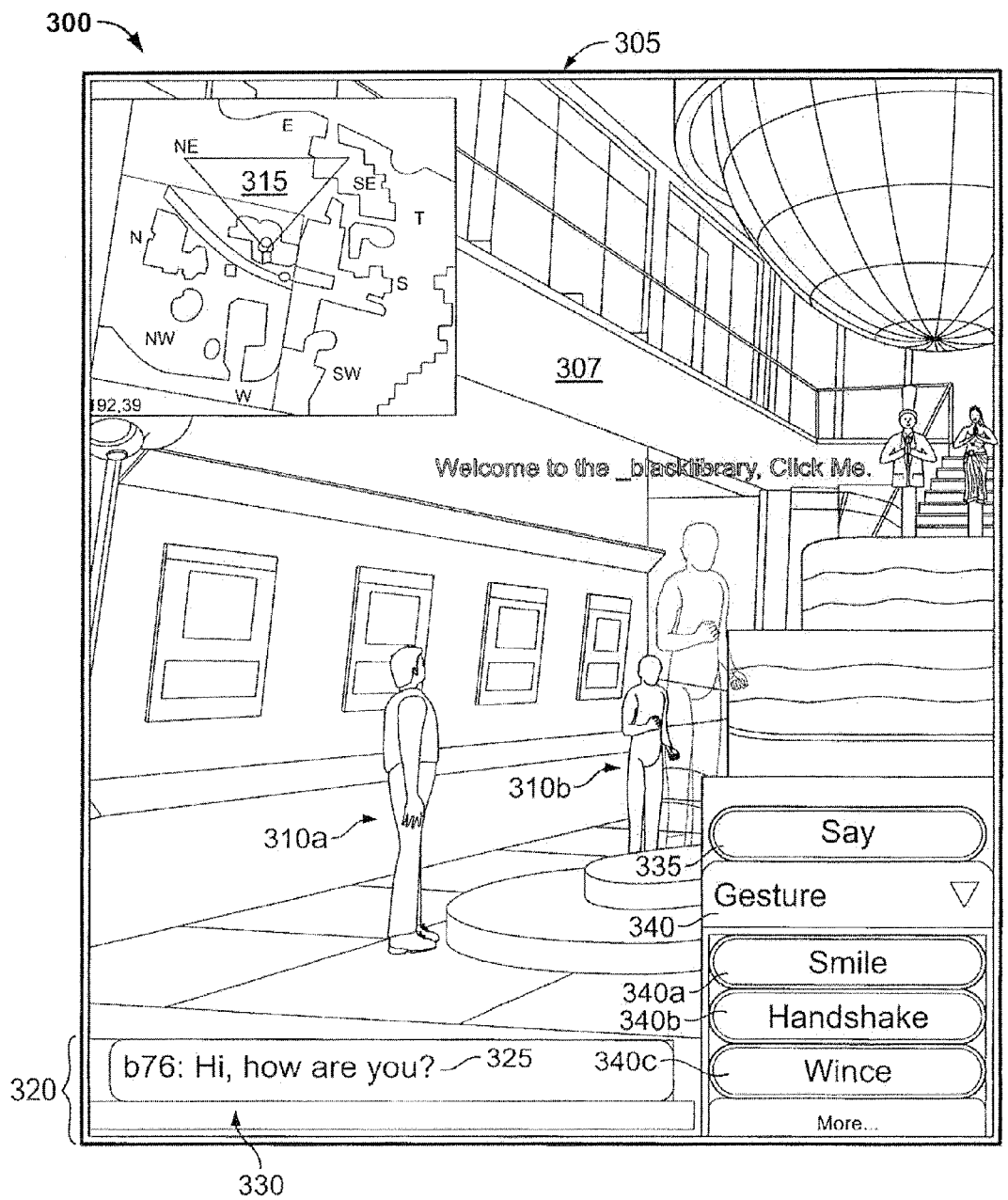
FIG. 3 illustrates an exemplary virtual world interface.

In addition to instant messaging, users of a network computing environment 100 may interact with each other inside a virtual world (VW) environment. FIG. 3 illustrates an exemplary virtual world interface presented to users of the virtual world environment, such as users operating client systems 105c-105d of FIG. 1. Users operating client systems 105c-105d may interact in shared, three-dimensional virtual world through their respective avatars 310a-310b, which are graphical representations of users in the virtual world system 300. Users operating client systems 105c-105d control their avatars through an interface of a VW client 305. For example, the interface 305 enables users to cause their respective avatars 310a-310b to travel around, gesticulate, or communicate with other avatars within the virtual world via text messages, voice, or movements. In addition, VW users may direct their avatars 310a-310b to interact with the 3D graphical scene in the virtual world by creating, moving, or touching various objects and scene elements. Examples of VW clients include "Second Life" by Linden Research, Inc. and "Virtual Worlds" by Microsoft.

As shown, a virtual world system 300 presents a user with a VW client interface 305. User interface 305 has a graphical view box 307, which displays the 3D scene of the virtual world from a point of view of the user's avatar. In addition, user interface 305 has a high-level, topological map of the virtual world 315, which may show users operating client systems 105c-105d the current location of their avatar on the overall map of the virtual world and also may allow users operating client systems 105c-105d to quickly zoom in to the specific locations within the virtual world.

VW users operating client systems 105c-105d can communicate or interact with the virtual world in a number of ways. For instance, the user operating client system 105c can send a message to the user operating client system 105d (typically in the form of text). Sending a message is done by typing the message in a messaging window 320. The messages may be perceived as the messages are exchanged. Messaging window 320 includes a text box 325 and an edit box 330. For example, the sent and received messages of the user operating client system 105c are displayed in text box 325. A user's screen name may be listed beside the avatar's corresponding message in text box 325. For instance, in the exemplary window shown, the user operating client system 105c has received a message "Hi, how are you?" from the user operating client system 105d (whose screen name is "b76"). To send a reply message, the user operating client system 105c types the message in edit box 330 and activates a send command by, for example, pressing an ENTER key.

Users also speak to each other and other users by using voice communications. For example, the user operating client system 105c may press a "Say" button 335 and begin a voice communications session with the user operating client system 105d. In addition, users operating client systems 105c-105d may cause their avatars 310a-310b to gesticulate to each other and other avatars by selecting from a variety of gestures from a pull-down menu 340. Selecting a gesture from the pull-down menu 340 causes user's avatar to perform a specific action in the virtual world. For example, the user operating client system 105c may select a "smile" gesture 340a from a list of available gestures 340, which will cause user's avatar 310a to smile. The actual number of available gestures or gesture combinations may be quite large. Users operating client systems 105c-105d may be able to cause their avatars to express a wide range of emotions, such as happiness, anger, or tiredness, by selecting from a variety of available gestures. For instance, the user operating client system 105c may cause avatar 310a to wince in pain and rub its belly to indicate a stomachache to the user operating client system 105d. In addition, a user may customize the expressions presented by their avatar. For example, the avatar may modify a profile to configure certain facial configurations to be associated with a specified trigger and/or mood. Alternatively or in addition, the user may specify an intensity of emotion that lies within an intensity spectrum. For example, a user may interact with a control mechanism numbered from 0 until 1000, where 0 represents a neutral mood, 100 represents a perturbed mood, 200 represents being upset, up until a value of 1000 (representing extreme anger). Each of the numbers may represent a setting for a facial expression (e.g., an intensity of a facial expression such as a furrowed brow). In the case where the furrowed brow reflects the mood, a first "range of motion" to a first position may represent progressive moods from 0-100 while a second "range of motion" may represent more extreme moods to a second position.

In yet another example, users operating client systems 105c-105d may control their avatars through the use of video with face/gesture/mood tracking software. For example, users operating client systems 105c-105d may configure a desktop video camera to track user actions and expressions in the real world and translate these actions to the avatar actions or moods in the virtual world. Thus, for example, when the user operating client system 105c smiles and waives his hand in front of the webcam, the face/gesture/mood tracking software will detect these actions of the user operating client system 105c and cause his avatar to smile and waive a hand in the virtual world.

For mood tracking, users operating client systems 105c-105d may utilize mood tracking techniques described in U.S. application Ser. No. 11/321,063, filed on Dec. 30, 2005, entitled "Mood-based organization and display of instant messenger buddy lists," the entire contents of which are hereby incorporated by reference. For example, users may train a mood tracking software for better mood recognition. To illustrate a training system, a mood tracking software may capture a user's facial image and analyze the user's facial expression as a baseline indicative of the user's mood. The mood tracking software may then present the user with a predicted image/mood indicator. The mood tracking system then may ask the user if the presented image/mood indicator is indicative of the mood felt by the user. Moreover, if the image/mood indicator is not indicative of expressed mood, the user may advance through a series of images captured during the training session to identify an image associated with the indicated mood. Another example used separately or addition to previously described examples allows a user to identify one or more components in a facial expression indicative of the desired mood (e.g., by allowing the user to highlight a brow structure, a lip structure such as a smile, or an existence of wrinkles in a particular portion). The above examples are only exemplarily and other techniques described in U.S. application Ser. No. 11/321,063 may be used for mood recognition.

The VW clients may use a virtual world server 120 to assist in communications between users of the VW clients. The VW server 120 may support VW services irrespective of a client user's network or Internet access. Thus, for example, VW server 120 may allow users to communicate with other users, regardless of whether they have access to any particular Internet service provider (ISP). The VW server 120 also may support associated services, such as billing, administrative matters, advertising, and directory services related to the virtual world.

To facilitate the transfer of data, the VW server 120 employs one or more standard or proprietary VW communication protocols. The one or more protocols may enable the VW server 120 to facilitate the establishment of a peer-to-peer communication session between the VW client clients, or assist VW communications by directly routing communications between the VW client clients.

To engage in VW communications when using the VW server 120, a VW client running on one of client systems 105c-105d establishes a connection with the VW server 120 and authenticates. Once authenticated, VW users operating client systems 105c-105d may use the VW client to create or modify their avatars 310a-310b, communicate with other VW users through avatars 310a-310b, or interact with the environment of the virtual world through avatars 310a-310b. For example, the user operating client system 105c may build a "virtual" object, such as a house, and rent this house to the user operating client system 105d for a fee. Then, the avatar 310b of the VW user operating client system 105d is able to inhabit the newly-built house and interact with the objects stored in the house.

VW users operating client systems 105c-105d may communicate with the users outside of the virtual world, such as IM users 105a-105b. This communications may be accomplished by sending instant messages between VW users operating client systems 105c-105d and IM users 105a-105b. Such communications may be either unidirectional or bidirectional—that is, VW users may send messages to IM users and/or IM users may send messages to VW users. Alternatively or in addition, such communications may include email, instant messages, voice communications, chat communications, voice-over-IP, or other communications.

Figure 4:
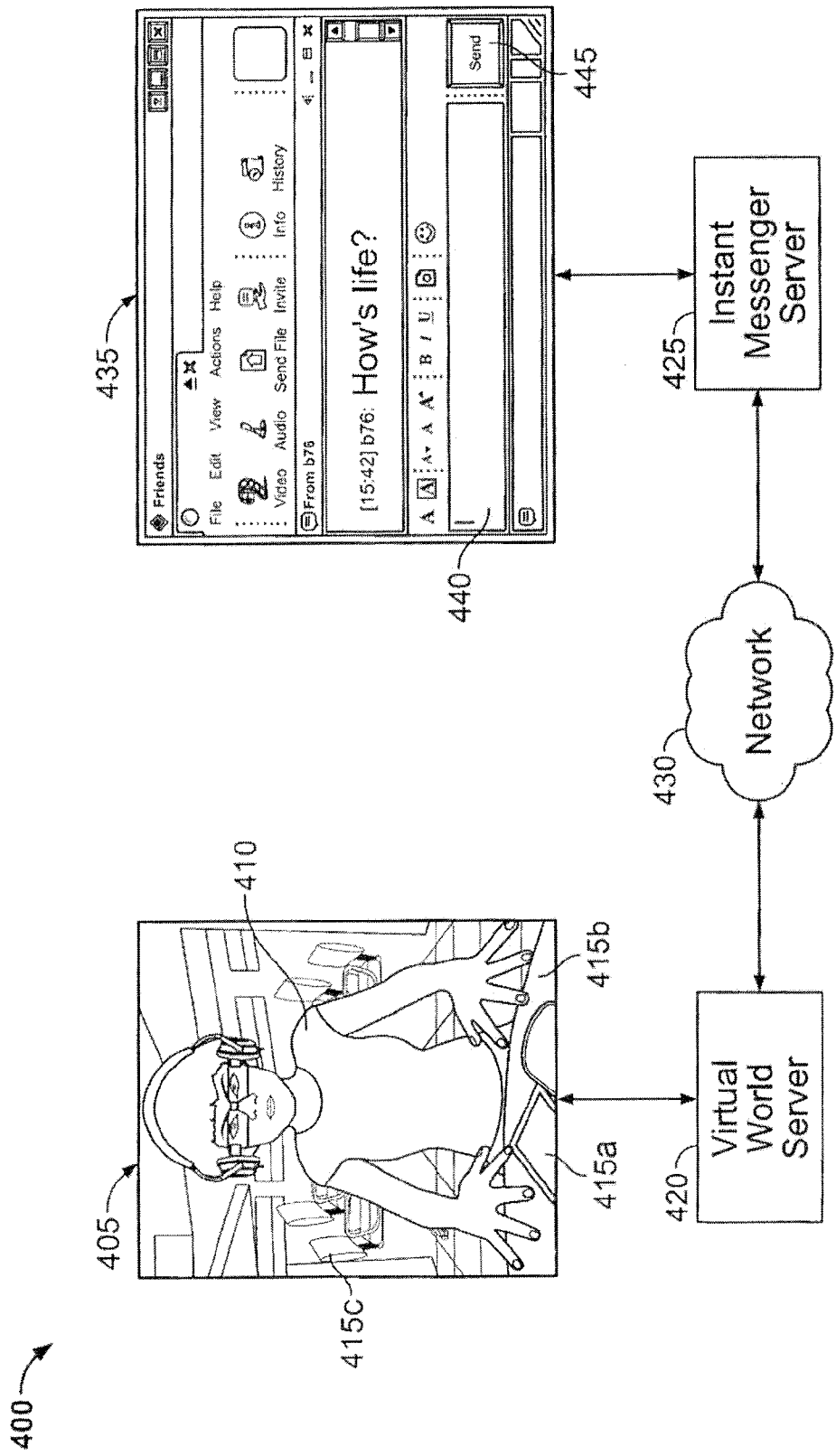
FIG. 4 illustrates communications between an instant messaging system and a virtual world system.

For example, FIG. 4 illustrates communications between an IM system 200 and a virtual world system 300. The VW user operating client system 105c may interact with the virtual world through a user interface of the VW client 405, which is similar to the previously discussed interface 305. The user operating client system 105c is represented in the virtual world by her avatar 410. As described with respect to FIG. 3, actions of the avatar 410 are controlled by the user operating client system 105c through the interface of the VW client 405. Here, for example, user operating client system 105c has directed her avatar 410 to read a book in a virtual library. Hence, avatar 410 is surrounded by a rich graphical environment representative, which includes books 415a, tables 415b, and chairs 415c. Avatar 410 may interact with any of these and other virtual objects.

The user operating client system 105c may wish to communicate with the IM user 105a. In this case, she sends a message from the VW interface 405 to the IM client of the IM user 105a. For instance, in the exemplary window shown, the VW user operating client system 105c (whose screen name is "b76") has sent a message "How is life?" to the IM user 105a. The sent message passes from the VW server 420 to the IM server 425 by way of the network 430, all of which have been described previously with respect to FIG. 1. The message is displayed to the IM user 105a through an interface 435 of the IM client, which has also been described previously with respect to FIG. 1. To send a reply message to the VW user operating client system 105c, the IM user 105a may type the message in edit box 440 and press an ENTER key or click on a Send icon 445.

Communications between the virtual world and text-based clients, such as instant messaging or email, may suffer in at least one respect. The range of avatar emotions, gestures, or moods displayed in a graphical virtual world system may be much "richer" than a similar range of emotions available in a text-based system. In a virtual world, users may be able to express a wide range of their emotions or moods, such as happiness, anger, or tiredness, by choosing a variety of non-verbal indicators for their avatars, including gestures, actions, or facial or body expressions. These indicators, known as paralinguistic indicators, describe the non-verbal elements of communication used to modify meaning and convey emotion. Thus, in the virtual world communications, paralinguistic elements may be expressed by the avatar's facial expressions, gestures, and/or interactions with the surrounding virtual environment.

Similarly, in the text-based communications users have traditionally conveyed their emotions by placing specific paralinguistic indicators within email, chartroom, or instant messages. However, in contrast to the virtual world communications, the paralinguistic indicators in the text-based communications may be more constrained in their scope and expressiveness. For example, text-based paralinguistic elements may be displayed by emoticons, font or color choices, capitalization and the use of non-alphabetic or abstract characters. In particular, emoticons are two-dimensional non-animated images (and sometimes non-animated) that are sent when certain triggers are included in the text of an email, a chat room message, or an instant message. A trigger may include any letter, number, or symbol that may be typed or otherwise entered using a keyboard or keypad. For example, a user may indicate her mood by sending a "smiley face" emoticon by including a ":-)" trigger in the message. In another example, a user may indicate that the user is shouting by capitalizing a message.

Referring to FIG. 5, a table 500 of text-based triggers associated with the commonly used emoticons 505 is shown. Each of the emoticons 505 has multiple associated triggers 510 or 515 which convey a specific meaning 517. More particularly, by way of example, the emoticon 520a, in which the avatar is made to smile, has associated triggers 520b-520c. Each of the triggers 520 includes multiple character strings. In particular, triggers may be include "sideways" expression triggers 520a, such as ":)" and ":-)", and English words, such as a "Nice" trigger 520b. Other examples of a trigger include a particular abbreviation, such as "lol," and an English phrase, such as "Oh no." As discussed previously, when one of the triggers is included in an instant message, the corresponding emoticon is sent in that instant message. In one example, when "Nice" is included in an instant message, the smiling emoticon is sent. In another example, when a user includes a ":P" text trigger in the instant message, a two-dimensional image of a smiley sticking a tongue out is sent to a recipient of the instant message.

When the VW user operating client system 105c communicates with the IM user 105a, paralinguistic indicators used in the virtual world (e.g., gesticulations, actions, facial expressions) are translated to the paralinguistic indicators used in the IM communications using, for example, emoticons or a description of the avatar in the VW. Similarly, paralinguistic indicators included in the communications from the IM user 105a to the VW user operating client system 105c also may be translated.

The translated paralinguistic indicators need to be at least partially synonymous to the original paralinguistic indicators. In other words, the content of non-verbal communications associated with a translated indicator should reflect, correspond to, be related to, or be supported by the content of non-verbal communications associated with the original indicator. Thus, for example, a paralinguistic indicator of "happiness" in the VW should be translated to a similar (although not necessarily identical) indicator in the IM system, such as a large smiley or a happy face. And while a degree of translation between indicators may vary, some correlation between the original and the translated indicators should exist. Therefore, an indicator of "happiness" should not be translated to an indicator that carries a meaning that is entirely unrelated to the original meaning, such as "sleepiness" or "angry."

Figure 6:
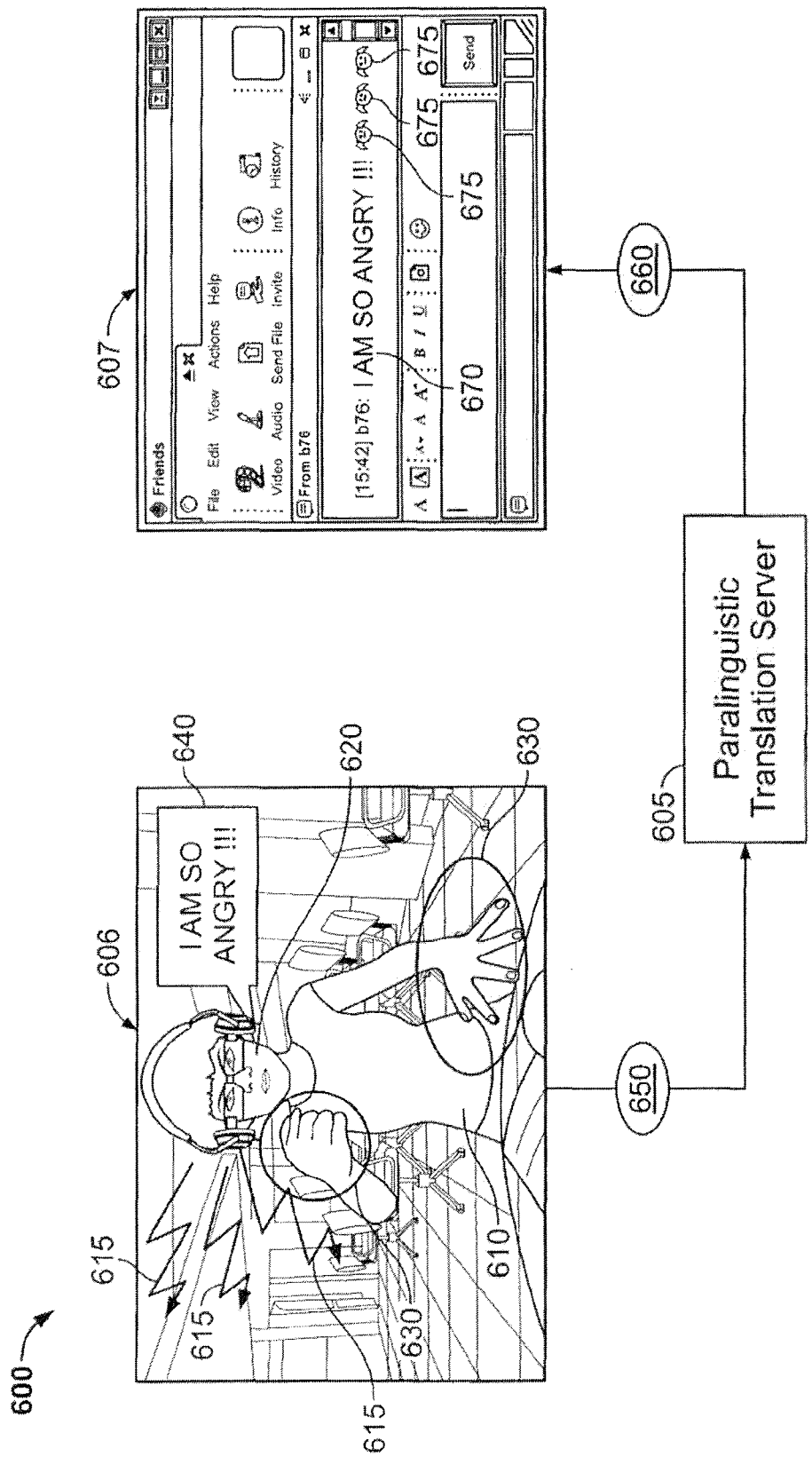
FIG. 6 illustrates a translation of paralinguistic indicators during communications between instant messaging system and a virtual world system.

FIG. 6 illustrates a system for translating paralinguistic indicators at a paralinguistic translation server 605. A user of a virtual world (VW) system 606 (previously described with respect to FIG. 3) is communicating with a user of an IM system 607 (as was previously described with respect to FIG. 2). The VW user operates an avatar 610 inside the virtual world. At some point, the VW user may wish to express a set of emotions or actions through the behavior of avatar 610 and have these emotions/actions communicated to the IM user. For example, if the VW user is feeling angry, the VW user may communicate an angry mood through actions of her avatar 610. The VW user may express her "virtual emotions" in a variety of ways. For instance, the VW user may indicate her anger by displaying the lighting bolts 615 around her avatar's face. In addition, a facial expression 620 of the avatar 610 and specific gesticulations, such as banging fists on the table 630, also may indicate an angry mood. Alternatively or in addition, the VW user may send a text message through the message window 640, where the contents, fonts, or colors of the text message itself may indicate a specific mood. For example, capitalization or very large fonts may indicate screaming. In yet another example, certain emotionally-charged words, such as "happy" or "angry", may indicate the communicated emotions when they appear in the text message. The VW user also may utilize voice communications to communicate with the IM user. In that case, the actual content of the voice communications as well as audio qualities of the voice communications, such as volume or pitch, may be analyzed to determine the emotions/moods. The above indicators of emotions/moods are only exemplary. Other paralinguistic indications of moods/emotions may be used and also may depend on the specific environment of the virtual world system and the desires of the VW user.

The paralinguistic indicators are encoded as a set of data and transmitted from the VW system 606 to the paralinguistic translation server 605 (650). The set of data may be encoded in a binary format or in a markup language, such as HTML or XML. In one XML-based example below, the paralinguistic indicators describe some of the paralinguistic indicators of the user's avatar:

```
<avatar version="1.0">
<?xml version="1.0" encoding="US-ASCII" standalone="yes"?>
    <body body_region="complete" width="512" height="512"
        <body_part name="hair"
            hair_color = "brown"
            texture = "curly"
            length = "long"
        </body_part>
        <body_part name="face"
            color = "green"
            texture = "rugged"
            mood = "agitated"
            expression = "angry"
        </body_part>
    </body>
</avatar>
```

The set of data specifying the paralinguistic indicators within the VW system 606 is received at the paralinguistic translation server 605. Subsequently, the paralinguistic translation server 605 translates paralinguistic indicators of the VW system 606 into the paralinguistic indicators of the IM system 607, such that the translated paralinguistic indicators of the IM system 607 are at least partially synonymous to the received paralinguistic indicators of the VW system 606. Therefore, the translated paralinguistic indicators reflect the content of the received paralinguistic indicators of the VW system 606. The translated paralinguistic indicators may reflect a robust set of content or just partial content, depending on a degree of translation.

In this example, the paralinguistic translation server 605 receives the set of data related to the avatar's mood in the VW system 606. The paralinguistic translation server 605 may evaluate the avatar's angry face 610, the lightning bolts surrounding the avatar 615, the hand gestures 630a-630b, or the actual content and capitalization of the message 640 ("I AM SO ANGRY!!!"), and translate the virtual world's paralinguistic indicators into the synonymous paralinguistic indicator in the IM system 607, such as an "angry bat" emoticon.

The translated emoticon is converted to a set of data related to the paralinguistic indicator in the IM system 607. For example, the paralinguistic translation server may encode the "angry bat" emoticon in such a combination of text triggers that would cause the IM system 607 to display the "angry bat" emoticon on the IM interface 670 when the instant message is received at the IM system 607.

Finally, the paralinguistic translation server transmits the set of data related to the translated paralinguistic indicator (e.g., "angry bat") to the IM system 607 (660). For example, the text triggers related to the "angry bat" emoticon are transmitted along with the text of the instant message to the IM user. When the IM user receives the instant message from the VW user, the IM user sees not only the text of the IM, but also the emoticons 675 displayed by the IM client. These emoticons are at least partially synonymous to the paralinguistic indicators (e.g., emotions, moods, actions, etc) of the VW user's avatar in the virtual world.

The above example demonstrated translation of paralinguistic indicators from the virtual world system to the instant messaging system. Additionally or alternatively, a similar translation may be used to translate communications from the IM system 607 to the VW system 606. For example, the user of the IM system 607 may type a message that includes some paralinguistic indicators, such as smiley faces. The instant message is then transmitted to the user of the VW system 606. In the course of processing the message, the paralinguistic indicators in the instant message are translated at the paralinguistic translation server 605 so that the VW user, in response to receiving an instant message from the IM user, may observe the translated paralinguistic indicators in the virtual world environment. For instance, if the IM user is represented by an avatar in the virtual world, the avatar displays emotions/actions that are at least partially synonymous to the meaning of the paralinguistic indicator in the instant message. Thus, if the IM user transmits a winking emoticon (";-)") to the VW user, the avatar for the IM user also may wink in the virtual world. In addition to the previously-described paralinguistic indicators, the IM user also may provide a variety of textual commands to control the behavior of his avatar in the virtual worlds. For instance, a user may type "lol," "ROFL" or <bang fists>, or <take 3 steps> or other combination of text-triggers/commands to cause his avatar to perform at least partially synonymous actions in the virtual world.

Figure 7:
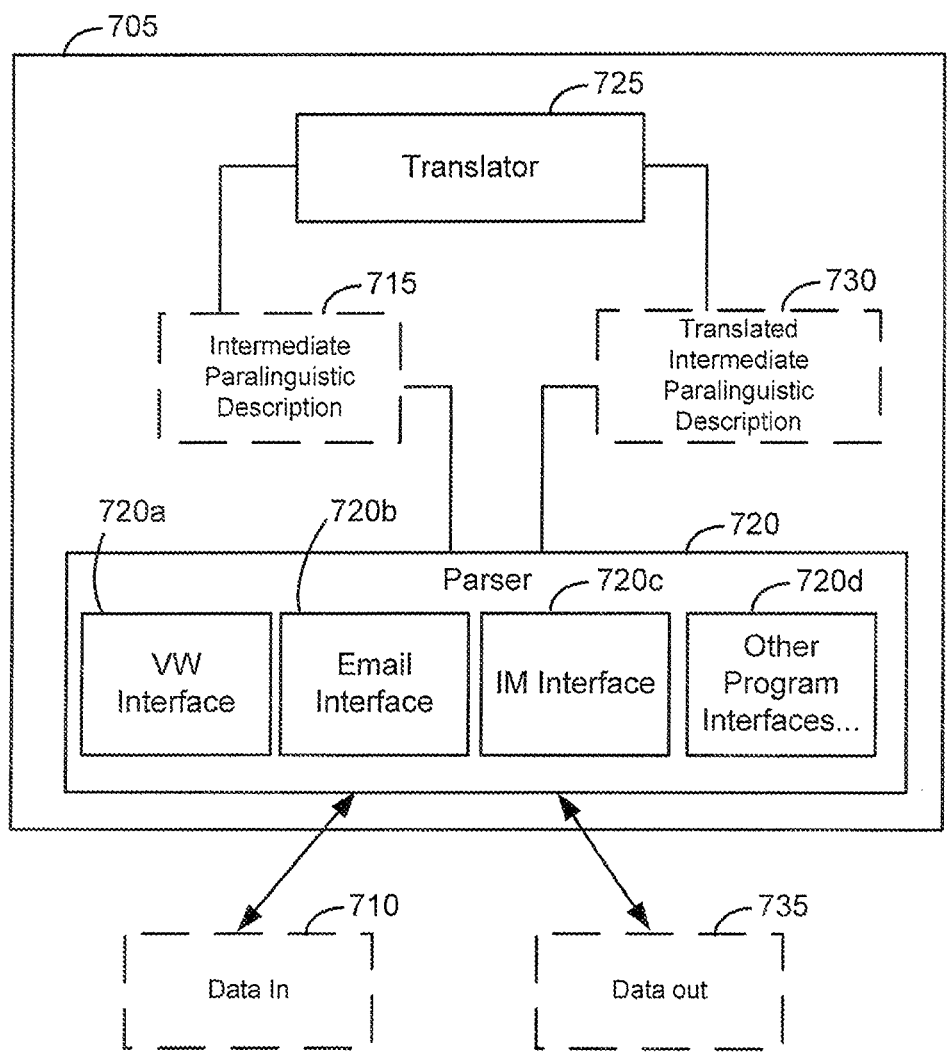
FIG. 7 is a block diagram of a paralinguistic translation server.

FIG. 7 illustrates a translation system 700 that includes an exemplary paralinguistic translation server 705. Paralinguistic translation server 705 is structured and arranged to receive, from a source, a first set of data 710 related to a first paralinguistic indicator that is configured to to enable non-verbal communications between a source and a destination, wherein the source is one of an instant messaging system and a virtual world system and the destination is one of the textual instant messaging system and a virtual world system but differs from the source. Paralinguistic translation server 705 is also structured and arranged to translate the first set of data 710 related to the first paralinguistic indicator into a second set of data 735 related to a second paralinguistic indicator that is at least partially synonymous to the non-verbal communications associated with the first paralinguistic indicator, and to transmit the second set of data 735 to the destination.

In more detail, paralinguistic translation server 705 includes a parser 720 that is structured and arranged to perform parsing on data sets related to paralinguistic indicators.

The parser 720 includes parsing interfaces 720a-720d. Parsing interfaces 720a-720d are capable of decoding data sets related to paralinguistic indicators from various instant messaging, email, or virtual world clients, and converting the decoded data sets into a common intermediate paralinguistic format. Alternatively or in addition, parsing interfaces 720a-720d may be used to convert data specified in the common intermediate paralinguistic format back into the specific formats used by the various instant messenger, email, or virtual world clients. Thus, the parser 720 may include interfaces 720a-720d for encoding or decoding data sets using a proprietary IM interface. Alternatively or in addition, the parser 720 may include interfaces for encoding or decoding data sets using the proprietary interfaces of different VW clients, such as Second Life.

Paralinguistic translation server 705 also includes a translator 725 that is structured and arranged to translate a set of data 710 related to the first paralinguistic indicator into a second set of data 735 related to a second paralinguistic indicator, such that the second paralinguistic indicator is at least partially synonymous to the first paralinguistic indicator.

Figure 8:
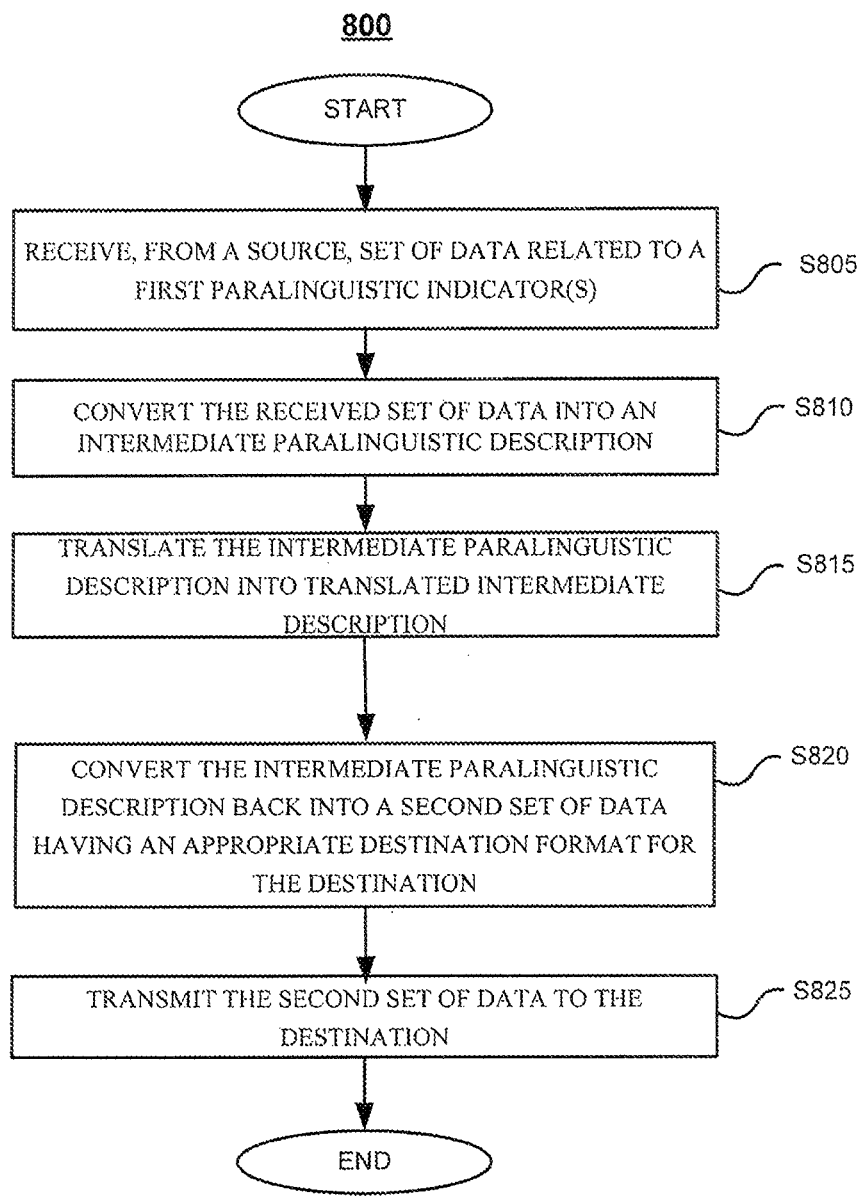
FIG. 8 is a flowchart of an exemplarily operation of a paralinguistic translation server.

FIG. 8 shows a flowchart 800 of an exemplarily operation of paralinguistic translation server 705 of FIG. 7. Paralinguistic translation server 705 receives, from a source, data set 710 related to a first paralinguistic indicator(s) (step 805). Data set 710 may be received, for example, from the VW server and thus, would describe paralinguistic indicators in the virtual world. Data set 710 may also be received from the IM server, and would then describe paralinguistic indicators in IM interface. Data set 710 may be specified in an Extensible Markup Language (XML), HTML, Python, the format used by the VW or IM clients, or any other open or proprietary format or scripting language. Data set 710 also may include a combination of text data, voice data, and video data.

Paralinguistic translation server 705 converts the received data 710 to an intermediate paralinguistic description (step 810). The conversion may use an intermediate paralinguistic description because protocols and formats used by different VW clients or IM clients are incompatible. Thus, a Yahoo instant messenger client and an AIM client may require different text triggers to elicit the same emoticon. Similarly, different virtual world clients also may use proprietary/incompatible formats related to the paralinguistic indicators. Therefore, paralinguistic translation server 705 may decode data sets expressed in different formats into the common format before proceeding with the actual translation. Operating on data sets in the common format enables a paralinguistic translation server 705 to translate the abstract meaning between paralinguistic indicators of different clients while avoiding additional complexity that may result from a requirement to operate in the particularities of the clients' data formats.

Paralinguistic translation server 705 may decode data set 710 into the intermediate paralinguistic description 715 using a parser 720. Intermediate paralinguistic description 715 may be expressed in an XML-based format. One illustrative example of an XML-based format for describing paralinguistic indicators is Emotion Annotation and Representation Language (EARL), currently in development by the W3 community. The XML-based format for describing paralinguistic indicators may include emotional tags for specifying emotions. Both simple and complex emotions may be specified. In addition, emotions may be grouped by categories, such as "negative and passive", "agitated," or "caring."

The XML-based format for describing paralinguistic indicators may be capable of describing a variety of emotional states by using emotional tags of varying complexity. A simpler emotional tag utilizes various attributes to specify a category, dimensions (e.g., intensity) and/or appraisals of a single emotional state. Emotional tags may include text, links to other XML nodes, or specify a time span using start and end times to define their scope.

In one implementation, an emotional tag may specify a homogenous emotion. For example, referring back to FIG. 6, the following XML tag may describe a simple angry emotion in the message 640:

<emotion category="anger">I AM SO ANGRY!!!</emotion>

On the other hand, a more complex emotional tag describes an emotion that is composed of several emotions. For example, complex emotions may be used in cases where two or more emotions co-occur, or situation where one emotion is masked by the simulation of another one. The table below specifies an exemplary XML schema for specifying complex emotions. Each complex emotion can have different intensity, modality, or probability. The intensity variable specifies the intensity of the emotion. The modality variable specifies how the emotion is expressed—e.g., the emotion may be expressed through speech, facial expressions, or specific body gestures. The probability variable assigns a probability to an event that a specific emotion will occur or is actually occurring. Other attributes of complex emotions, such as time durations for each sub-emotion, may be used.

```
<xsd:schema xmlns:xsd="http://www.w3.org/2001/XMLSchema">
    <xsd:simpleType name="modalityType">
        <xsd:enumeration value="voice"/>
        <xsd:enumeration value="text"/>
        <xsd:enumeration value="face"/>
        <xsd:enumeration value="body"/>
    </xsd:simpleType>
    <xsd:attribute name="modality" type="modalityType" use="optional"/>
    <xsd:attribute name="probability" type="xsd:float" use="optional"/>
    <xsd:attribute name="intensity" type="xsd:float" use="optional"/>
</xsd:schema>
```

For example, the following XML tag may describe a complex angry emotion expressed by the avatar 610 in FIG. 6:

```
<complex-emotion>
    <emotion category="anger" modality="face" intensity="0.5"/>
    <emotion category="stress" modality="face" />
    <emotion category="anxiety" modality="body" />
</complex-emotion>
```

As can be seen from the above example, the described complex emotion not only takes into account the facial expressions 620 of the avatar 610, but also its various gesticulations, such as hand movements 630. As a result, a much more complete emotional snapshot may be conveyed for the avatar 610.

The paralinguistic translation server 705 next translates intermediate paralinguistic description 715 into translated intermediate description 730 (step 815). However, the translating process also may be performed directly on the data related to the paralinguistic indicators without first converting it to the intermediate paralinguistic format 715. For example, the paralinguistic translation server 705 may translate directly between paralinguistic indicators of the IM and the VW clients if these clients use the same or similar format for describing their paralinguistic indicators.

A variety of methods may be utilized at the paralinguistic translation server 705 for translating between paralinguistic indicators, whether they are expressed in the intermediate paralinguistic format 715 or not. For example, translation tables may be used. That is, direct translations may be identified from/to the paralinguistic indicators (or their intermediate descriptions) of the IM client to/from the paralinguistic indicators of the VW client.

For example, the paralinguistic indicators expressed in the intermediate format 715 may be first matched based on the category of emotions described in the schema shown in FIG. 9 (e.g., "happiness", "anger"). Next, the paralinguistic translation server selects a synonymous emotion appropriate for the IM client from the same emotional category. However, because the expressive capabilities of the IM client may be limited when compared to the expressive capabilities of the VW client, some complex emotions in the virtual world, especially the ones involving gesticulations or movements may not translate directly into the limited set of emotions available to the IM client. In such cases, the paralinguistic translation server 705 may convert (i.e., downgrade) the complex emotion from the virtual world to either a less complex emotion or a simple emotion for the IM client. In addition, the paralinguistic translation server 705 may add textual descriptions to the paralinguistic indicators to describe or supplement the translated paralinguistic indicators from the virtual world. In situations where the complexity of the emotion expressed in the virtual world is less than the complexity of the available emotion in the IM client, an upgrading conversion may be required. For example, additional parameters may be added to the translated paralinguistic indicator intended for the IM client.

Alternatively or in addition, more complex translation techniques may be used. For example, the paralinguistic indicators may be translated using XSLT (Extensible Stylesheet Language Transformations), by using neural networks that identify similar expressions and emotions (even if not identical), or by utilizing knowledge-based machine translation.

Two examples of translating paralinguistic indicators follow. The first example describes a translation of paralinguistic indicators sent from the IM client to the VW client. The second example describes a translation of paralinguistic indicators sent from the VW client to the IM client.

In the first example, an IM user (e.g., user 120a from FIG. 1) sends an angry message to the VW user (e.g., user operating client system 105c from FIG. 1). Specifically, the IM user 105a sends a message to the VW user operating client system 105c, which includes a ">:-<" trigger indicating an "absolutely livid!" emotion. The paralinguistic translation server 705 receives the instant message, decodes its contents using the IM interface 720c, and retrieves the data related to the paralinguistic indicator of the IM user 105a. In this example, the data includes a ">:-<" trigger. Parser 720 converts the received paralinguistic indicator to the intermediate paralinguistic format 715. For example, because the 'absolutely livid' emotion is more complex than a simple "mad" or "angry" emotion, the paralinguistic translation server 705 may convert "absolutely livid" to the following exemplarily complex emotion:

```
<complex-emotion>
    <emotion category="anger" modality="face"
    arousal="0.9" power="0.6"/>
    <emotion category=" agitation" modality="face"
    arousal="0.3" power="0.5"/>
</complex-emotion>
```

The paralinguistic translation server 705 also adjusts numerical values of the parameters of the complex emotion, such that the complex emotion most closely matches the parameters of the original paralinguistic indicator. Next, the paralinguistic translation server translates the complex emotion expressed in the intermediate paralinguistic format 715 to a synonymous complex emotion 730 that would be appropriate in the virtual world, while taking into the account the visual capabilities of the virtual world. For example, because the avatars in the virtual world are capable of expressing not only facial expressions, but also gesticulations, the paralinguistic translation server may add additional parameters to the complex emotion, such as hand or head movements. Other various facial/physical expressions and actions may be added to fully capture the emotion in the virtual world. The resulting translation may look as the following:

```
<complex-emotion>
    <emotion category="anger" modality="face"
    arousal="0.9" power="0.6"/>
    <emotion category="agitation" modality="face"
    arousal="0.3" power="0.5"/>
    <emotion category="frustration" modality ="body"
    arousal="0.4" power="0.7"/>
    <emotion category="confusion" modality="body"/>
</complex-emotion>
```

In the second example, VW user operating client system 105c communicates with the IM user 105a. For example, the VW user operating client system 105c places his avatar in an elated mood. In addition, the VW user operating client system 105c makes his avatar display various celebratory hand gestures, such as "high fives." The paralinguistic translation server 705 receives data 710, which specifies avatar's actions/mood in the virtual world and decodes data 710 by using the VW interface 720a. Using the previously described parsing process, the paralinguistic translation server 705 converts the decoded data from the VW client into the intermediate paralinguistic format 715. For example, avatars actions/mood/emotions may be converted to the following exemplarily complex emotion:

```
<complex-emotion>
    <emotion category="happy" modality="face"
    arousal="0.9" power="0.6"/>
    <emotion category="elation" modality="face"
    arousal="0.5" power="0.5"/>
    <emotion category=" excitement " modality="figure"
    power="0.2"/>
</complex-emotion>
```

Subsequently, the paralinguistic translation server 705 translates the complex emotion of the virtual world to a synonymous complex emotion that would be appropriate for the instant messaging, while also taking into the account the visual capabilities of the IM client. For example, because the visual capabilities of the IM client are limited when compared to the visual capabilities of the VW client, some complex emotions in the virtual world, especially the ones involving gesticulations or movements may not translate directly into the limited set of emoticons available to the IM client. In such a case, the paralinguistic translation server may convert the complex emotion from the virtual world to either a less complex emotion or a simple emotion. Additionally or alternatively, the paralinguistic translation server 705 may add textual descriptions to the instant message to describe or supplement the translated paralinguistic indicators. For example, the paralinguistic translation server may add "avatar waiving hand+jumping around the purple fountain" text to the instant message to describe avatar's actions in the virtual world. The resulting translation of the virtual world's paralinguistic indicator may look as following:

```
<emotion category="happy">avatar waiving hands+
jumping around </emotion>
```

In the next step, the translated complex emotion expressed as the intermediate paralinguistic description 730 is converted into a set of data 735 having an appropriate format for the destination (step 820). This may be accomplished by parser 720, which encodes the intermediate paralinguistic description 730 using the appropriate interface. Therefore, in the case of the first example, (IM to VW translation), parser 720 uses VW interface 720a to convert the intermediate paralinguistic description 730 into the VW format. In the case of the second example, (VW to IM translation), parser 720 uses IM interface 720c to convert the intermediate paralinguistic description 730 into the IM data. For instance, the IM interface 720c encodes the above emotion as "^5"(high five) and ":-))" (very happy face) and inserts these text triggers into the instant message 735. Alternatively or additionally, the IM interface 720c may supplement the instant message 735 with textual descriptions of the actions taking place in the virtual world. For example, the textual description "randomuser is very happy, jumping around the purple fountain and waiving hands" is inserted in the text of the instant message 735.

Finally, encoded data 735 is transmitted to a destination (step 825). In case of the first example, the resulting data 735 related to the paralinguistic indicators, now in the VW format, is then transmitted to the VW server. Consequently, the avatar of the IM user in the virtual world shows an angry face while also displaying some frustrated hand gestures. In case of the second example, the resulting data specifying the translated paralinguistic indicators in the IM format 735 is transmitted to the IM server or the IM client. Consequently, the IM client displays the text of the transmitted instant message, along with the translated emoticons, on the IM user's desktop.

FIG. 9 illustrates an exemplary XML schema that may be used to represent mood information as paralinguistic indicators are translated between IM and VWs. The schema 900 supports a number of different emotions, which are grouped by emotional categories 905a-905g, such as "negative and forceful", "positive and lively," or "caring."

The schema 900 is capable of describing a variety of emotional states by using emotional tags of varying complexity. A simpler emotional tag utilizes various attributes to specify a category, dimensions (e.g., intensity) and/or appraisals of a single emotional state. Emotional tags may enclose text, links to other XML nodes, or specify a time span using start and end times to define their scope.

The paralinguistic translation server also may translate paralinguistic indicators by evaluating not only one indicator at a time, but also using an overall paralinguistic state of a user. That is, some users do not (or may not) abruptly transition between moods. For example, if a user is unhappy, the user may remain in an unhappy state of mind for some time.

As a result, even if the user includes a "happy" emoticon in the instant message after thirty minutes of angry communications, it is possible that the happy emotion is highly transient or is not fully established. Thus, the paralinguistic translation server may track the user's paralinguistic state and utilize that state during the current or future translations of paralinguistic indicators. The paralinguistic state may be based on the context of current/previous textual communications as well as the previous values of the paralinguistic indicators collected over some time period. The XML-based values of emotional parameters discussed with respect to FIGS. 7, 8 and 9 may be used during calculations of the user's paralinguistic state. In one example, the paralinguistic translation server may keep a running average of paralinguistic values (e.g., category, modality, probability, intensity, etc.) to ensure that the user's translated emotions do not transition abruptly. Additionally or alternatively, the paralinguistic translation server may return the user's paralinguistic indicators back to the original state or an adjusted state if the paralinguistic translation server determines that user's emotional change was merely transient. Maintaining persistency in the user's paralinguistic state may allow the paralinguistic translation server to convey more realistic behavior on behalf of the IM user. A short example to illustrate the above concept follows.

An IM user is represented by an avatar in the virtual world. The paralinguistic translation server tracks the IM user's paralinguistic state. For example, based on the previous communications, the paralinguistic server determines that the IM user has been in an "angry" state for over 5 minutes. As a result, the IM user's avatar has been continuously placed in an "angry" state as well. Then, the IM user sends an instant message which includes a "smiley" emoticon. The paralinguistic translation server may detect that the "smiley" emoticon conflicts with the IM user's currently "angry" paralinguistic state. As a result, the paralinguistic translation server may translate the paralinguistic indicator (i.e., "smiley" emoticon) to a partially synonymous paralinguistic indicator in the virtual world (e.g., cause avatar to smile), but then return the IM user's avatar to the previous "angry" state. Additionally or alternatively, the paralinguistic translation server may adjust the IM user's state to "less angry." Thus, IM user's avatar would return to an angry or somewhat less angry state after smiling, but would not immediately transition to the "smiling" state.

In one implementation, translating a mood or expression may be performed using a hierarchy of moods to address inconsistencies between capabilities in the IM and VW systems. For example, a user in a VW system may be furious, which does not appear as a registered mood in the IM system. The paralinguistic translation server may recognize that "furious" is a subset of "angry", which the IM system does recognize. As a result, the paralinguistic translation server may translate the "furious" to "angry" in response to determining that the IM system does not recognize the value "furious" and that "furious" is a subset of "angry."

It will be understood that various modifications may be made without departing from spirit and scope of the claims. For example, the operations may be performed in a different order and/or the components in the disclosed systems may be combined in a different manner and/or replaced or supplemented by other components. As an example, the paralinguistic translation server may be located on the IM server, VW server, or client computers. Other implementations are within the scope of the following claims.

What is claimed:

1. A computer-implemented method for electronic communications, comprising:
   receiving data representing a paralinguistic indicator from a first user using a gaming platform, wherein the paralinguistic indicator has a first appearance and is associated with the gaming platform;
   translating the paralinguistic indicator to have a second appearance which is different from the first appearance, wherein the translated paralinguistic indicator is associated with a real time messaging platform; and
   sending the translated paralinguistic indicator to a second user using the real time messaging platform,
   wherein the gaming platform is a virtual world platform and the real time messaging platform is an instant messaging platform.

2. The computer-implemented method of claim 1, wherein the first and second paralinguistic indicators represent emotions.

3. The computer-implemented method of claim 1, wherein the first and second paralinguistic indicators represent actions.

4. The computer-implemented method of claim 3, wherein the first paralinguistic indicator represents an avatar's actions.

5. The computer-implemented method of claim 1, wherein the received paralinguistic indicator comprises a non-verbal indicator.

6. The computer-implemented method of claim 1, wherein at least one of the gaming platform and the real time messaging platform is a proprietary communications platform.

7. The computer-implemented method of claim 1, further comprising receiving a plurality of types of data representing the paralinguistic indicator from the first user.

8. The computer-implemented method of claim 7, wherein the second appearance is influenced by the plurality of types of data representing the paralinguistic indicator.

9. The computer-implemented method of claim 8, wherein the second appearance comprises a complex emotional appearance based on the plurality of types of data representing the paralinguistic indicator.

10. A computer-based system for electronic communications comprising at least one processor and at least one storage medium storing a plurality of instructions, the plurality of instructions being executable by the at least one processor for:
    receiving data representing a paralinguistic indicator from a first user using a gaming platform, wherein the paralinguistic indicator has a first appearance and is associated with the gaming platform;
    translating, using the at least one processor, the paralinguistic indicator to have a second appearance which is different from the first appearance, wherein the translated paralinguistic indicator is associated with a real time messaging platform; and
    sending the translated paralinguistic indicator to a second user using the real time messaging platform,
    wherein the gaming platform is a virtual world platform and the real time messaging platform is an instant messaging platform.

11. The system of claim 10, wherein the first and second paralinguistic indicators represent emotions.

12. The system of claim 10, wherein the first and second paralinguistic indicators represent actions.

13. The system of claim 12, wherein the first paralinguistic indicator represents an avatar's actions.

14. The system of claim 10, wherein the received paralinguistic indicator comprises a non-verbal indicator.

15. The system of claim 10, wherein at least one of the gaming platform and the real time messaging platform is a proprietary communications platform.

16. The system of claim 10, further comprising executable instructions for receiving a plurality of types of data representing the paralinguistic indicator from the first user.

17. The system of claim 16, wherein the second appearance is influenced by the plurality of types of data representing the paralinguistic indicator.

18. The system of claim 17, wherein the second appearance comprises a complex emotional appearance based on the plurality of types of data representing the paralinguistic indicator.

* * * * *